United States Patent Office 3,370,054
Patented Feb. 20, 1968

3,370,054
ZEIN PREPARED BY STRONG ALKALI HYDROLYSIS OF AQUEOUS ALCOHOLIC ZEIN SOLUTIONS AND SUBSEQUENT ACID PRECIPITATION OF THE ALKALI
Frederic C. Loew, Ridgewood, N.J., assignor to Interchemical Corporation, New York, N.Y., a corporation of Ohio
No Drawing. Filed Mar. 5, 1965, Ser. No. 437,557
6 Claims. (Cl. 260—123)

ABSTRACT OF THE DISCLOSURE

Deamidated zein dispersible in solutions having a pH of at least 6.5 is prepared by hydrolyzing zein with strong alkalies, particularly the alkaline earths or lithium hydroxide in aqueous alcohol. The alkali is then removed by precipitation; for instance barium hydroxide is precipitated with sulfuric acid. For many end uses the precipitate does not have to be removed nor does the zein have to be recovered from the reaction mixture.

---

This invention relates to the modification of zein by a process of alkaline hydrolysis that only slightly degrades the zein.

The art is well acquainted with deamidation of zein by acid hydrolysis, as described for example in U.S. Patent 3,010,953. Alkaline hydrolysis has not been used for this purpose because it degrades the protein too much. Acid hydrolysis of zein yields a modified form that is dispersible in water at pH values as low as 6.5, depending on the number of carboxyl groups in the molecule. The product is useful in water-based coating compositions where low solvent content is desirable or where good water tolerance of a high solvent system is required. The acid process is carried out by treating zein in an aqueous solution of acetone, dioxane, secondary and tertiary alcohols, etc. with a mineral acid. Sulfuric acid, being relatively inexpensive and less corrosive than hydrochloric acid, is preferred. The zein thus deamidated is precipitated, filtered off, and dried. By incorporating the acid treatment in a zein production stream, precipitating and drying need be done only once. That is, production of zein requires precipitation and drying but if zein so produced is then deamidated by acid treatment, precipitation and drying are again required, thus increasing the cost of the product. There has consequently been a demand for a deamidation process that would dispense with the extra steps. For instance it would be desirable to prepare deamidated zein directly in various aqueous alcohol solutions of low alcohol content where the end use requires such a solvent combination. The acid process is handicapped in this respect because at least 40% solvent is required to dissolve unmodified zein under neutral or acid conditions. Removal of excess solvent after deamidation is not economically attractive.

Alkaline hydrolysis of proteins is also known, but is less selective and degrades too much of the protein. This process has therefore been rejected by industry.

It has now been found that deamidated zein dispersible in solutions having a pH of 6.50 or more can be prepared by alkaline hydrolysis in such a way that very little degradation takes place and therefore film properties are not significantly impaired. The process makes use of strong alkalies which can be neutralized to form precipitates so that only a negligible amount of salt is left in solution. The alkali and precipitant should of course be selected with the particular end use in mind. The efficiency of precipitants varies somewhat with the solvent, of course. For instance lithium sulfate is fairly soluble in water (1 part in 4 of water) but is insoluble in ethyl alcohol. Where the end use is a pigmented film, as in an ink composition, the precipitate does not interfere and therefore there is no need to remove it from the reaction mixture. Examples of combinations are lithium or the alkaline earth hydroxides or oxides and as precipitates sulfuric acid, phosphoric acid, ammonium chromate, ammonium carbonate, etc. The economic aspects are of prime importance as far as commercial uses are concerned. From this aspect the use of barium hydroxide or oxide and sulfuric acid is the most attractive combination.

Hydrolysis may be carried out in monohydric aliphatic primary, secondary, or tertiary alcohols having 1 to 4 carbon atoms in the chain. Dihydric alcohols such as ethylene glycol, propylene glycol, diethylene glycol, or dipropylene glycol may also be used. In acid hydrolysis of zein, primary alcohols cannot be used without causing considerable esterification of the zein.

It is sometimes desirable to add stabilizers to counteract the tendency of the polymer to precipitate when the process is carried out near its limits of efficiency. Such stabilizers might be urea or carboxyl-containing rosin-derivatives. A wide range of materials may be used for this purpose; but this does not constitute a critical feature of the invention. Any additive selected should of course be appropriate for the end use intended. Where the composition is to be stored for some time before using, it is advisable to add a suitable pesticide, as is well known in the art.

Example 1

A solution of 1.17 lbs. of anhydrous barium hydroxide in 11.9 lbs. of isopropanol and 31.6 lbs. of water was warmed to 120° F. and then zein (24 lbs.) was added over a period of about 15 minutes while the batch was stirred rapidly. After the zein was practically all dissolved the temperature was raised to the reflux point of (184° F.) and held there 30 minutes. The charge was then allowed to cool below reflux temperature and ⅔ lb. of 98% sulfuric acid added, with due precautions. The batch was allowed to cool below 150° F. and 0.34 lb. of 28% aqueous ammonia was added. The resulting material had a pH of 8.5. Filtration was carried out in a plate and frame filter press. The barium sulfate passed through the filter press and remained in the zein solution.

The ratio of alkali to zein in this example was 57 milliequivalents of barium hydroxide per 100 g. of zein. The hydrolysis was conducted at 185° F. for 30 minutes. Films of this zein were comparable to those from good acid process zein.

Example 2

The procedure was similar to that in Example 1, but barium oxide was the alkali used and hydrolysis was carried out for 15 minutes. Film properties of the zein thus prepared were comparable to those of good acid process zein.

Example 3

Example 2 was repeated, but hydrolysis was carried out for 45 minutes. Film-forming properties were similar to those of the zein prepared as in Example 2.

Example 4

Example 2 was repeated but hydrolysis was carried out for 75 minutes. The resulting deamidated zein was as satisfactory as in the preceding examples.

Example 5

Example 2 was repeated but using 63 milliequivalents of barium oxide per 100 g. of zein and carrying out the hydrolysis for 30 minutes. The zein was comparable to the products of the preceding examples.

Example 6

Example 5 was repeated, but using 74 milliequivalents of barium oxide. The resulting zein had film properties not quite as good as those of films from Example 5 zein.

Example 7

Example 1 was repeated, but with 157 milliequivalents of barium hydroxide per 100 g. of zein and hydrolysis was carried out for 60 minutes. The film-forming properties of the product were not very good because of too much degradation of the zein. The zein of this example, however, was suitable for adhesives and in other products where the film forming requirements are not too exacting.

Example 8

1.9 g. of barium oxide were dissolved in 63.5 g. ethylene glycol and 3 g. water by stirring and heating. The temperature was adjusted to about 50° C. and 30.0 g. zein added, with vigorous stirring. After being heated for 10–15 minutes at 50–60° C. the zein had mostly dissolved. The temperature was then raised to about 110–115° C. and maintained at that level for about 25 minutes. The batch was cooled to 80–90° C. and 1.25 g. of 98% sulfuric acid added. Finally 0.30 g. of 28% ammonia was added, bringing the pH of the solution up to 8.4. A pH down to about 7.0 is also satisfactory.

The hydrolysis is preferably carried out at temperatures of from about 80° C. to about 115° C. for from about 10 minutes to about 70 minutes. The variation of zein concentration versus solvent composition shown in the examples is not a critical range. No effect was observed on the efficiency of hydrolysis for instance with zein concentrations of about 35–43% with solvent compositions of about 2–4 parts of water to 1 part of isopropanol.

As an illustration of a commercial application of the zein of this invention, a water-based ink was compounded from the zein composition of Example 8, pigments, and rosin derivatives.

The film properties of these zein compositions compare favorably with those made from acid process zein and the compositions typically have good flow properties, showing little or no thixotropy, even after storage for several months.

In the claims parts are parts by weight.

What is claimed is:

1. A process of hydrolyzing zein comprising
   (a) adding about 30 to 45 parts of zein to about 70–55 parts of a strongly alkaline solution of water and alcohol,
   (b) the ratio of water to alcohol being from about 1/20 to about 4/1,
   (c) the alcohol being selected from the group consisting of methyl alcohol, ethyl alcohol, n-propyl alcohol, isopropyl alcohol, n-butyl alcohol, secondary butyl alcohol, tertiary butyl alcohol, ethylene glycol, propylene glycol, diethylene glycol, and dipropylene glycol,
   (d) the alkali being selected from the group consisting of the hydroxides and oxides of barium, strontium, calcium, and lithium,
   (e) heating the mixture until the zein is sufficiently deamidated, to be dispersible in solutions having a pH of at least 6.5,
   (f) adding a stoichiometric quantity of a suitable precipitant for the alkali metal present,
   (g) the precipitant being selected from the group consisting of a suitable acid and a salt of such an acid formed from a volatile base,
   (h) adjusting the pH of the batch up to at least about 6.5.

2. The process of claim 1 wherein the alkali metal is barium and the precipitant is sulfuric acid.

3. The process of claim 2 wherein the solvent is selected from the group consisting of isopropyl alcohol and ethylene glycol.

4. The process of claim 2 wherein there are present from about 35 to about 157 milliequivalents of barium for each 100 grams of zein.

5. The process of claim 4 wherein the hydrolysis is carried out in step (e) by heating the batch at from about 85° C. to about 115° C. for from about 10 to about 70 minutes.

6. The zein composition prepared by the process described in claim 1.

References Cited

UNITED STATES PATENTS 696,156   3/1902   Wulkan _____ 127—34

WILLIAM H. SHORT, *Primary Examiner.*

H. SCHAIN, *Assistant Examiner.*